United States Patent
Robert

(10) Patent No.: US 9,491,824 B2
(45) Date of Patent: Nov. 8, 2016

(54) METHOD AND APPARATUS FOR PRECISE TEMPERATURE BRIGHTNESS COMPENSATION OF LED

(71) Applicant: Svetlana Eden, Nashville, TN (US)

(72) Inventor: Kasimov Robert, Nashville, TN (US)

( * ) Notice: Subject to any disclaimer, the term of this patent is extended or adjusted under 35 U.S.C. 154(b) by 80 days.

(21) Appl. No.: 14/451,435

(22) Filed: Aug. 5, 2014

(65) Prior Publication Data

US 2016/0044760 A1 Feb. 11, 2016

(51) Int. Cl.
*H05B 33/08* (2006.01)

(52) U.S. Cl.
CPC ...... *H05B 33/0851* (2013.01); *H05B 33/0815* (2013.01)

(58) Field of Classification Search
CPC .......... H05B 33/0815; H05B 33/0851; H05B 33/0818; H05B 33/086; H05B 33/0854; H05B 33/08; H01S 5/06808; H01S 5/02415; H01S 5/00; H01S 5/024
See application file for complete search history.

(56) References Cited

U.S. PATENT DOCUMENTS

| | | | | |
|---|---|---|---|---|
| 4,604,753 A | * | 8/1986 | Sawai | H01S 5/02415 372/29.01 |
| 5,392,303 A | * | 2/1995 | Shiozawa | H01S 5/06808 372/26 |
| 6,807,202 B1 | * | 10/2004 | Plamper | H01S 5/06808 372/29.014 |

* cited by examiner

*Primary Examiner* — Alexander H Taningco
*Assistant Examiner* — Seokjin Kim
(74) *Attorney, Agent, or Firm* — Norred Law, PLLC; Warren V. Norred

(57) ABSTRACT

The invention is a method and apparatus to provide a temperature compensation for LED brightness utilizing temperature dependence of voltage-current characteristic of the LED. Methods ensure the precise compensation of brightness of LED using two or more temperatures to tune an LED driver circuit without the use of thermistors or other temperature sensor.
This method also allows for circuits that compensate brightness not only of a single LED but of an assembly of LEDs. The method allows to manufacture LED modules with built-in temperature brightness compensation circuit. These modules can be used in a variety of illuminating equipment including but not limited to home lights, vehicle turn or brake signals, traffic lights, and a backlight for LCD display.

9 Claims, 9 Drawing Sheets

Fig.3

| |
|---|
| 1. Place the LED or the assembly of LEDs 070 into temperature-controlled chamber 040 with output window 050. |
| 2. Connect the LED or the assembly of LEDs 070 to the adjustable power supply unit 010, the voltmeter 020 and the ammeter 030. |
| 3. Direct the light of the LED or the assembly of the LEDs 070 to the light meter 060 through output window 050. |
| 4. Set a high working temperature in the temperature-controlled chamber 040. |
| 5. Adjust the adjustable power supply unit 010 so that the light meter 060 reads the required brightness of the LED or LED assembly 070. |
| 6. Record the current 212 and the forward voltage 213 of the LED or assembly of LEDs 070 and plot first point 211 into coordinate space current – voltage. |
| 7. Set a low working temperature in the temperature-controlled chamber 040. |
| 8. Adjust the adjustable power supply unit 010 so that the light meter 060 reads the same brightness. |
| 9. Record the current 222 and the forward voltage 223 of the LED or assembly of LEDs 070 and plot second point 221 into coordinate space current – voltage. |
| 10. Connect points 211 and 221 with straight line 230 until it crosses the current and the voltage axes. |
| 11. Use the voltage intercept point 232 of line to calculate optimal voltage value of source supply of the LED or the assembly of LEDs 070. |
| 12. Use the ratio of the intercept voltage value to the intercept current value, points 232 and 231 of line 230 gives the value of the optimal resistance of the resistor for supply the LED or assembly of LEDs 070. |

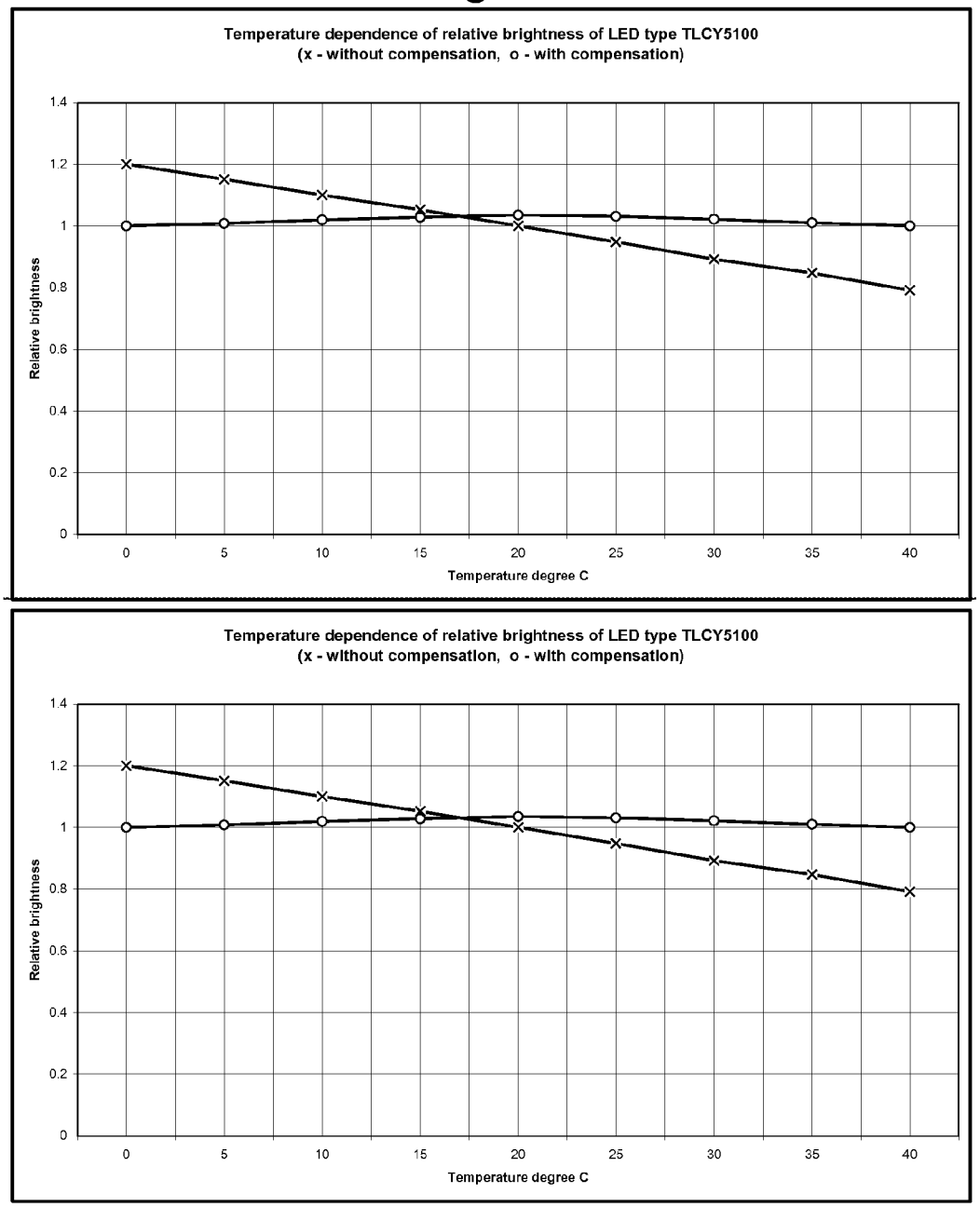

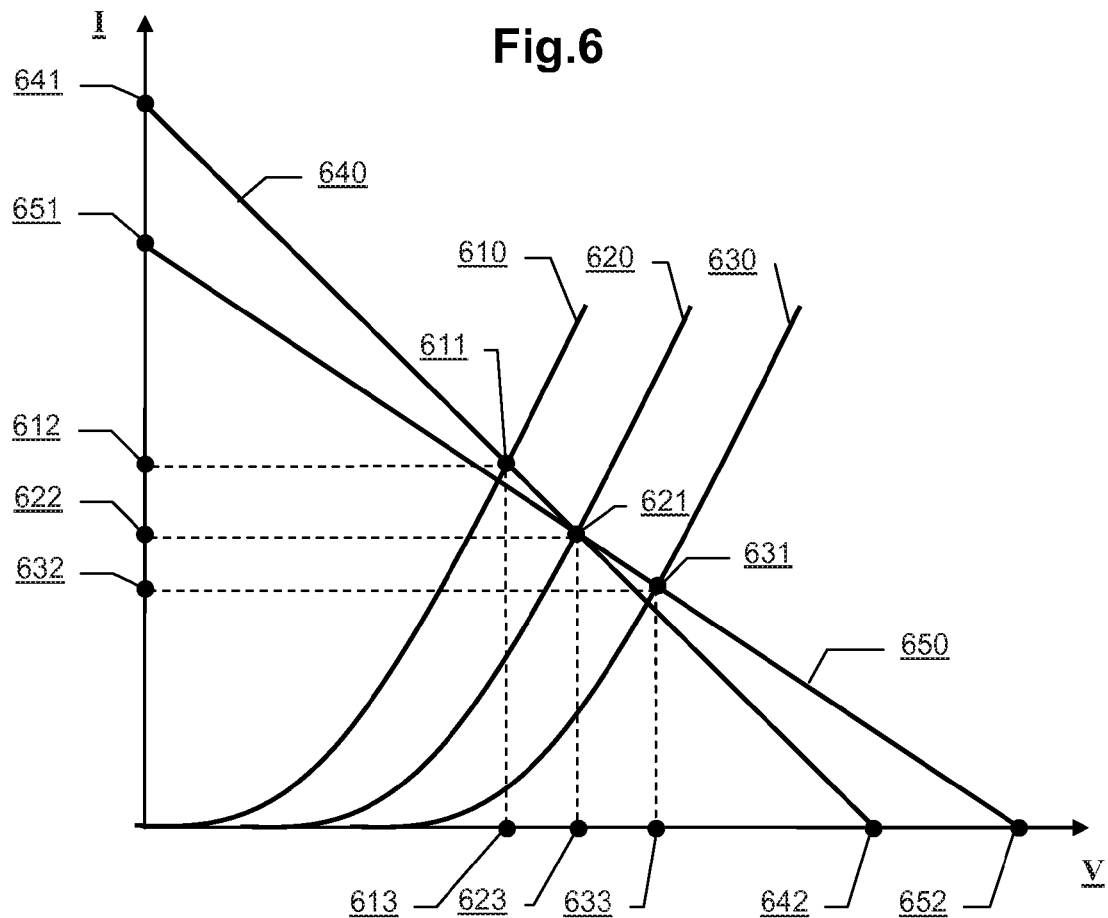

Fig.7

1. Divide the temperature operating range of the LED or the assembly of LED at two temperature intervals: from high to middle temperature and from middle to low temperature.

2. For temperature interval from high to middle temperatures using aforesaid method find first optimal voltage and first optimal resistance.

3. For temperature interval from middle to low temperatures using aforesaid method find second optimal voltage and second optimal resistance.

4. Record the value of the forward voltage of the LED or assembly of LEDs at middle temperature.

5. With an increasing temperature and a decreasing voltage of the LED or assembly of LEDs is less then recorded the forward voltage at middle temperature connect LED or assembly of LED to the power supply with first optimal voltage through resistor with first optimal resistance.

6. With a decreasing temperature and increasing the forward voltage of the LED or the assembly of LEDs equal or more then recorded the forward voltage at middle temperature connect LED or assembly of LEDs to power supply with second optimal voltage through resistor with second optimal resistance.

METHOD AND APPARATUS FOR PRECISE TEMPERATURE BRIGHTNESS COMPENSATION OF LED

TECHNICAL FIELD OF THE INVENTION

The present invention relates to lighting control systems for Light Emitting Diode (LED) equipment, notably temperature brightness compensation of LED for lighting systems.

BACKGROUND OF THE INVENTION

Light-emitting diodes (LED) lighting has become increasingly more popular in recent years. As a source of light, LED has many advantages over incandescent lighting, including high efficiency, reliability, and long life. However, the brightness of LED depends on temperature P-N junction and ambient temperature fluctuations. This imperfection limits the use of LED in some areas of applications.

There are many patents which describe methods to address LED brightness, attempting to correct operating conditions to create stable lighting brightness. Most of these methods use external temperature sensors, such as PTC and NTC thermo-resistors, semiconductor diodes, and transistors of various sorts.

All circuits that use external temperature sensors have one shortcoming: they assume that the temperature of an LED is the same as the temperature of the sensor. This assumption is not valid; the temperatures of the LED and the sensor are not the same. Because of this, the temperature brightness compensation of LED with external temperature sensors is far from inexact. Moreover, if ambient temperature varies quickly, compensation of brightness occurs after the circuitry reaches thermal equilibrium. Additionally, the added external sensors and components reduce reliability and increases the costs of illuminators.

Currently, the following LED drivers integrated circuits (ics) include temperature brightness compensation:

A) Driver CL25 is a two-terminal element that functions as a current stabilizer. A typical application for the CL25 is to drive LEDs with constant current of 25 ma. It can also be used in parallel to provide higher current such as 50 ma, 75 ma or 100 ma. Typical temperature coefficient about +0.01%/° C. is insufficient for brightness compensation for most LEDs.

B) Driver MT7910 accepts a wide ranging dc voltage input to a switching regulator and used to power high brightness LEDs, and can be tuned to supply a wide range of current from just a few milliamps to more than an amp. It also includes a 0-245 mv linear dimming and temperature compensation of the LED current. For proper operation, this IC needs an external temperature sensor and a few ancillary components, such as a power transistor, damping diode, inductor, and capacitor.

The necessity of an external temperature sensor is a significant limitation in use of LED drivers.

Because an LED is a semiconductor diode, its forward voltage decreases when temperature rises and increases when temperature drops; this realization allows an LED to be used as a temperature sensor. U.S. Pat. No. 7,683,864 "LED driving apparatus with temperature compensation function" describes the following method: the electric circuit measures the forward voltage of an LED, compares it with a reference voltage and then manages current flow—increasing current when the voltage difference indicates a temperature rise and decreasing current when the temperature drops.

FIG. 1A is a block diagram of a prior art LED driving unit. Reference to FIG. 1A, the prior art's LED driving unit includes: reference voltage generator 100, the amplification unit 200, driving unit 300, LED 400, repeating amplifier 500, and current limiter 600. The forward voltage across LED 400 is fed into the pass repeating amplifier 500 on the amplification unit 200 where is compared with reference voltage generator 100. Difference signal pass current limiter 600 and come to driving unit 300. A driving unit 300 adjusts a supply voltage of LED 400 in response to the voltage of the differential amplification unit 200. An increased temperature causes a decrease of the forward voltage across LED 400. A difference voltage between the reference voltage generator 100 and a forward voltage to LED 400 is increased and force driving unit 300 increases LED supply current.

The prior-described prior art has difficulties. The forward voltage across the LED depends not only on temperature but also on forward current. An increase of forward current with increasing temperature causes an additional increase in forward voltage. The control system perceives this fact as decreasing of temperature and stops correcting the brightness. Therefore the compensation of brightness is partial, as confirmed by the experimental evidence shown on FIG. 1B from the aforementioned patent.

The temperature dependence of brightness is determined by the type of semi-conductive material. For example, ultra-bright LEDs TLCX510 of Company Vishay are made of material aluminium indium gallium phosphide on gallium arsenide to radiate light of different color. Each color LED has different operating characteristics, including temperature dependence on brightness.

The brightness of an LED can be reported as a comparison relative to its reference brightness level, typically at 25° C. By definition, the relative brightness of an LED at +25° C. is one; in the range of temperatures −40° C. to +85° C., the change of relative brightness is 2.2 to 0.6 for red LEDs, 2.3 to 0.4 for yellow LEDs, and 2.6 to 0.48 for green.

Other materials show similar changes in brightness. For example, ultra bright LEDs type TLHB580 made of gallium nitride on silicon carbide can radiate blue or white (with phosphor) light. As temperature ranges from −10° C. to +100° C., brightness changes 1.15 to 0.3.

The LED industry is continuously in need of better ways of providing consistent brightness in LEDs over a range of temperature and operating conditions that does not depend on external sensors whose operational characteristics are susceptible to temperature change.

SUMMARY OF THE INVENTION

The disclosed invention teaches a method and circuit which calculates a constant voltage power source and series resistance to power an LED or LED assembly so that the brightness of the LED will be the same throughout its expected operating temperature range. Throughout this application, references to an LED can also refer to an LED assembly of multiple LEDs.

These aforesaid parameters of supply, values of voltage and resistance, will be denoted as optimal voltage and optimal resistance. The method is designed to obtain the optimal voltage of power supply and the optimal resistance for temperature brightness compensation of LED. It is also possible to select a power supply voltage and series resistor such that the brightness of the LED will be increase or decrease with a rise in temperature.

The present invention solves the problems of temperature brightness compensation of a LED using an inexpensive power supply and simple design. The present invention proposes a method for choosing the parameters for the power supply. The method ensures the exact compensation of brightness for two, three and more pre-specified temperatures. This patent gives examples of circuits implementing the method and provides experimental confirmation of its efficiency. The patent also describes examples of actual circuits that limit the working current or engage an emergency shut-down in case when maximum allowed current is exceeded.

Electrical circuits for supplying LED utilizing the method comprise a voltage stabilizer with an optimal output voltage and an internal resistance. If the internal resistance of the voltage stabilizer is much less than the optimal resistance then the external resistor must be equal to the optimal resistance. In general, the sum of the internal resistance of the voltage stabilizer and the external resistor must be equal the optimal resistance. The method proves to be useful for illuminating equipment containing series circuit of LEDs. In this case, the output voltage stabilizer must be equal to the product of the optimal voltage for a single LED and the number of LEDs in a series circuit. The optimal resistance must be equal to the product of the optimal resistance of a single LED and the number of LEDs in a series circuit. The same series circuit of LEDs can be connected in parallel. In this case the optimal voltage is the same as in the case of a single series circuit of LEDs. The optimal resistance is equal to the optimal resistance of one series circuit divided by the number of parallel branches. But the best design uses a resistor in every series of LEDs so current is equalized in all parallel circuits. A voltage drop across the external resistor may be used to protect the circuit of LEDs or to turn off LEDs in case of alert condition. The aforesaid voltage stabilizer may be designed as an analogous circuit as well as a pulse circuit. The aforesaid method can execute precise brightness compensation of LED at two, three or more temperatures.

BRIEF DESCRIPTION OF THE DRAWINGS

FIG. 3 is a block diagram of the method of precise temperature brightness compensation to precisely compensate brightness of LED for two temperatures.

FIG. 4A is a graph showing experimental result of the precise temperature brightness compensation for TLCY5100 LEDs at two temperatures.

FIG. 6 is a graph explaining a method of precise temperature brightness compensation using three temperatures points.

FIG. 7 is a schematic block diagram disclosing the method compensating for a temperature range of LED brightness using three temperatures.

Figure 1A:
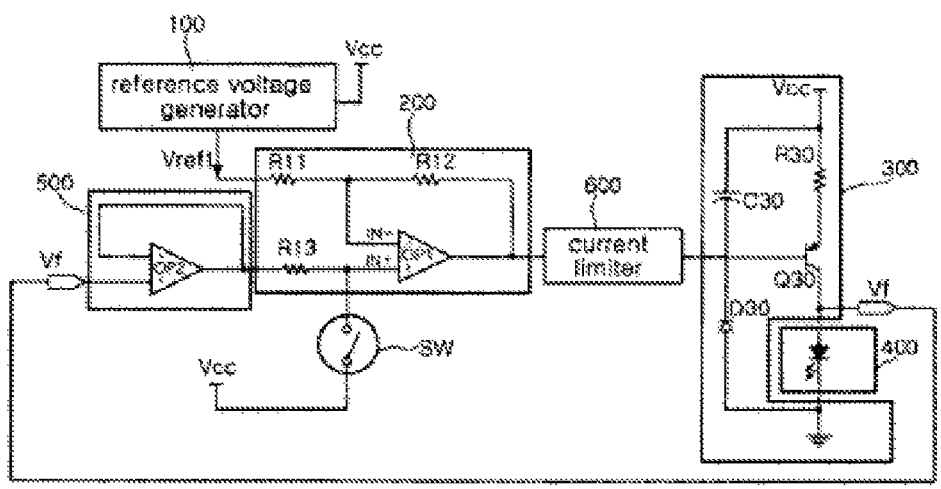
FIG. 1A is a block diagram of a prior art LED driving apparatus.
Figure 1B:
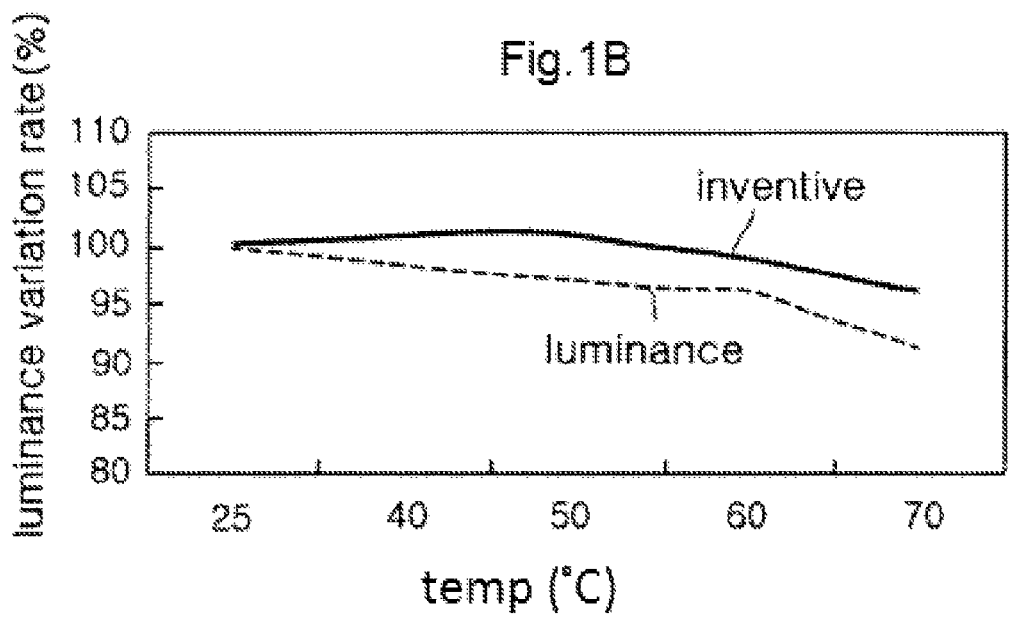
FIG. 1B is a graph showing results from a temperature-compensating circuit as described in FIG. 1A.

Manufacturers recommend powering LEDs by a current source. However, using a constant current source to power LEDs has the natural result that LED brightness changes with temperature.

Manufacturers recommend against use of constant voltages to supply LEDs, as the LED can be ruined by excessive current and resulting heat. However, if the LED is supplied from a voltage source with a voltage value equal to the forward voltage of the LED with a current set at a value less than the LED's maximum current, then the LED can safely operate. Moreover, under such conditions the LED demonstrates surprising behavior; the brightness of an LED increases with increasing temperature and decrease with decreasing temperature. This occurs because an increase in temperature decreases the forward voltage of the LED and increases the current through LED, leading to a higher brightness.

Conversely, a decrease in temperature increases the forward voltage of LED and current through the LED decreases, leading to a decreasing brightness. Therefore, it is possible to select a value of voltage of power supply and resistance of series resistor such that the brightness of the LED will be the same both at low and at high temperatures. These aforesaid parameters of supply, values of voltage and resistance, will be denoted as optimal voltage and optimal resistance. The method is designed to obtain the optimal voltage of power supply and the optimal resistance for temperature brightness compensation of LED. It is also possible to select a power supply voltage and series resistor such that the brightness of the LED will be increase or decrease with a rise in temperature.

The method presented in the invention, develops an optimal voltage power supply output and optimal resistance, so that LED brightness both at low and at high temperatures will be the same. To achieve excellent temperature-compensation of LED brightness, an LED must receive power from an optimal voltage though optimal resistor.

To get optimal parameters of power supply it is necessary to use a measuring system that includes the following widely available equipment: an adjustable power supply unit, a voltmeter, an ammeter, a temperature-controlled chamber with a window for light to exit, and a light meter.

To get optimal parameters of power supply of LED it is necessary to execute the following steps: place the LED into the temperature-controlled chamber and connect the LED to an adjustable power supply unit, the voltmeter measuring forward voltage across the LED, and the ammeter set in series with the LED.

A user installs the LED so it emits the light onto the light meter through the window of the temperature-controlled chamber. Set high working temperature of the LED in the temperature-controlled chamber and after the temperature stabilizes, adjust the constant voltage power supply unit so that the light meter reads a required brightness of the LED.

Because the heat caused by the current of the LED can disturb the thermal equilibrium, it is necessary to wait until the light meter is steady. Thereafter keep adjusting the brightness of the LED until the required brightness is achieved.

A user measures and records the values of the current through the LED, and forward voltage across the LED at a high working temperature, and then plot these values as a first point on a two-dimensional graph using current and voltage as the two axes.

A user then repeats the process by setting a low working temperature of the LED in the temperature-controlled chamber, and after a thermal equilibrium is reached adjust power supply unit until the light meter reads the same the brightness of the LED as at the brightness at the high working temperature.

The user then records the values of the current and the forward voltage of the LED and plots these values as the second point on a two-dimensional graph using current and voltage as the two axes.

To find the optimal voltage, a user connects the first and the second points with a straight line and continues this line until it crosses the current and the voltage axes.

The resulting intercept with voltage axis gives optimal voltage power supply of the LED. The ratio of the voltage to current intercepts gives the optimal resistance of resistor for supply of LED. The order in which the temperature of the temperature-controlled container is set is not essential. It can be first set to low working temperature and then to high working temperature. Users can obtain axis intercepts of the current and the voltage axes analytically using the first and second coordinate points.

The method can be applied to both single LED and an assembly of LEDs connected in series and in-parallel series circuits. The assembly of LEDs must be constructed with heatsinks.

The described method is excellent when the temperature dependence of brightness is linear. The majority of devices for indoor use operate in a temperature range from +5° C. to +35° C., so the typical temperature range of 0° C. +40° C. easily covers a temperature range for all indoor light equipment. These devices include, but not limited to LCD screen, TV, and computers with LED backlight, home light, etc. A precise compensation of brightness is very important for reserve color temperature (white balance) in color LCD displays and TV.

At the temperature range of −40° C. +85° C., the LED's temperature dependence of brightness is nonlinear, and the brightness compensation may be less efficient. The method can be easily modified to achieve perfect brightness compensation of LEDs in a wide range of temperatures.

The idea is to choose several temperature values, in which constant brightness level must be maintained. Without loss generality, the method is expanded for three temperature values.

First, it is necessary to choose three temperature points for high, middle and low temperatures, surrounding the range where precise temperature compensation is needed. The temperature range is divided into two temperature intervals: from high to middle temperature and from middle to low temperature.

Using aforesaid method, the user finds the optimal voltage of the first power supply and the first optimal resistor value for the temperature intervals from high to middle temperature.

The user then repeats the previous step, finding the optimal voltage of the second power supply and the second optimal resistor value for the temperature intervals from middle to low temperature and recording the value of the forward voltage at middle temperature. If the actual forward voltage of the LED or the assembly of LEDs is greater than the recorded forward voltage at middle temperature, then the user connects the LED or the assembly of LEDs to the second power supply through the second optimal resistor.

If the actual forward voltage of the LED or the assembly of LEDs is less than or equal to the recorded forward voltage at middle temperature, then the user connects the LED to first power supply through the first optimal resistor.

The middle temperature can be chosen in the middle temperature range. The best performance of the method is achieved by selection the middle temperature where the function of brightness versus temperature is curved the most. The middle temperature value is defined by using the following steps. First, using the described method of temperature brightness compensation for two temperatures the optimal voltage and the optimal resistance are found for low and high temperature points. Then the graph of brightness versus temperature is plotted. Finally, the middle temperature is found by choosing a temperature value that maximizes the deviation of brightness from the desired brightness level.

The method can adopted to achieve precise brightness compensation of LED at any number of temperature values. The method works as follows with n temperatures: $T_1$, $T_2$, $T_i$ ... $T_{n-1}$, $T_n$ such that $T_1 > T_2 > T_i > ... > T_n$, which divides the temperature range into n−1 temperature intervals: first— from $T_1$ to $T_2$, second—from $T_2$ to $T_3$, etc., and at last from $T_{n-1}$ to $T_n$ temperatures.

The user follows the previously described process to gather optimal parameters of supply for every temperature interval, recording the forward voltage values at each temperature. Comparing the forward voltage of the LED to the recorded forward voltage, the LED or the assembly of LEDs should be connected to the previous temperature interval power supply with the corresponding optimal voltage and optimal resistance that is less than the recorded forward voltage for Ti.

If the forward voltage of the LED becomes greater or equal to the recorded forward voltage for Ti, the LED should be connected to the following temperature interval power supply with the corresponding optimal voltage and optimal resistance.

DESCRIPTION OF EMBODIMENTS

Experiments have confirmed the performance of the precise temperature brightness compensation method for two temperatures by testing super bright LEDs manufactured by company Vishay. Two types of LEDs, one with yellow color light (TLCY5100) and the other one with white color light (HB5-439AWD) were chosen to demonstrate the performance of the method.

Example 1

The experiment was conducted by the instrumentality measuring the system shown on FIG. 1A for temperature range from 0° C. to +40° C. with intervals of 5° C. This experimental data is presented in the Table 1. First, the brightness of LED type TLCY5100 was measured at temperature 20° C. and current 17 ma. This brightness value was taken as a reference and was used to compute relative brightness by dividing the brightness of the LED by the reference brightness. Next, relative brightness was measured in the specified temperature range using two power sources: a current power supply, and the aforesaid optimal supply.

The data of the relative brightness of the LED with supply by current source 17 ma is presented in the second row of Table 1. This data show that in the temperature range from 0° C. to +40° C., the relative brightness of the LED varies in the range of ±20%. The data of relative brightness of the LED with supply by the optimal voltage source 2.16 V and through the optimal resistor 8.49 Ohm is presented in the third row of Table 1. This data show that in the temperature range from 0° C. to +40° C., the relative brightness of the LED varies in the range of ±1.85%. Thus the temperature compensation of brightness reduces the variation of brightness of LED more than 10 times.

TABLE 1

| Temperature ° C. | 0 | 5 | 10 | 15 | 20 | 25 | 30 | 35 | 40 |
|---|---|---|---|---|---|---|---|---|---|
| Relative brightness without compensation | 1.2 | 1.151 | 1.1 | 1.052 | 1.0 | 0.948 | 0.892 | 0.847 | 0.791 |
| Relative brightness with compensation | 1.0 | 1.008 | 1.019 | 1.028 | 1.037 | 1.031 | 1.021 | 1.01 | 1.0 |

FIG. 3A presents experimental data for LED yellow color type TLCY5100 before and after the precise temperature brightness compensation.

Annex 1—The optimal voltage and the optimal resistance were calculated by the instrumentality the aforesaid measuring system. First, the brightness of LED type TLCY5100 was measured at temperature 20° C. and current 17 ma. This brightness was taken as the reference brightness and all the following brightness values were normalized by this reference level.

However, at temperature of 40° C., the reference brightness level was achieved by adjusting the current value (19.7 ma). The forward voltage value of the LED is 1.99 V. This pair of current-voltage (19.7 ma:1.99V) was plotted in the current-voltage coordinates. Next, at temperature 0° C., the reference brightness level was achieved by adjusting the current value (13.8 ma). The forward voltage value of the LED is 2.04 V. This pair of current-voltage (13.8 ma:2.04V) was also plotted in the current-voltage coordinates. The mentioned points with coordinates (19.7 ma:1.99V) and (13.8 ma:2.04V) were connected by a straight line until the crossed the voltage (V) and the current (I) axes. The intercept of the voltage axis (2.16 V) was defined as the optimal voltage of the supply. The intercept of the current axis was I=254.5 ma. The ratio of voltage intercept (2.16 V) to the current intercept (254.5 ma) of the straight line was defined as the optimal resistance (8.49 Ohm) value for the supply of LED, ensuring equal brightness values for both low and high ambient temperature.

Example 2

The Experiment was Conducted by the instrumentality measuring system shown on FIG. 1A for temperature range from 0° C. to +40° C. with intervals of 5° C. This experimental data is presented in the Table 2. First, the brightness of LED type HB5-439AWD was measured at temperature 20° C. and current 17 ma. This brightness value was taken as a reference and was used to compute relative brightness by dividing the brightness of the LED by the reference brightness. Next, relative brightness was measured in the specified temperature range using two power sources: a current power supply, and the aforesaid optimal supply. The data of the relative brightness of the LED with supply by current source 17 ma is presented in the second row of Table 2. This data show that in the temperature range from 0° C. to +40° C., the relative brightness of the LED varies in the range of ±8%. The data of relative brightness of the LED with supply by the optimal voltage source 3.51 V and through the optimal resistor 24.0 Ohm is presented in the third row of Table 2. This data show that in the temperature range from 0° C. to +40° C., the relative brightness of the LED varies in the range of ±0.2%. Thus the temperature compensation of brightness reduces the variation of brightness of LED in 40 times.

TABLE 2

| Temperature ° C. | 0 | 5 | 10 | 15 | 20 | 25 | 30 | 35 | 40 |
|---|---|---|---|---|---|---|---|---|---|
| Relative brightness without compensation | 1.08 | 1.06 | 1.04 | 1.02 | 1.0 | 0.98 | 0.96 | 0.94 | 0.92 |
| Relative brightness with compensation | 1.0 | 1.001 | 1.002 | 1.004 | 1.004 | 1.003 | 1.002 | 1.001 | 1.0 |

FIG. 3B presents experimental data for LED white color type HB5-439AWD before and after the precise temperature brightness compensation.

Annex 2. The optimal voltage and the optimal resistance were calculated by the instrumentality the aforesaid measuring system. First, the brightness of LED type HB5-439AWD was measured at 20° C. and current 17 ma. This brightness was taken as the reference brightness and all the following brightness values were normalized by this reference level. Then is at +40° C., the reference brightness level was achieved by adjusting the current value (18.2 ma). The forward voltage value of the LED is 3.07 V. This pair of current-voltage (18.2 ma:3.07V) was plotted in the current-voltage coordinates. Next, at temperature 0° C., the reference brightness level was achieved by adjusting the current value (15.7 ma). The forward voltage value of the LED is 3.13 V. This pair of current-voltage (15.7 ma:3.13V) was also plotted in the current-voltage coordinates.

The mentioned points with coordinates (18.2 ma:3.07V) and (15.7 ma:3.13V) were connected by a straight line until the crossed the voltage (V) and the current (I) axes. The intercept of the voltage axis (3.51 V) was defined as the optimal voltage of the supply. The intercept of the current axis was I=146.1 ma. The ratio of voltage intercept (3.51 V) to the current intercept (146.1 ma) of the straight line was defined as the optimal resistance (24.0 Ohm) value for the supply of LED, ensuring is equal brightness values for both low and high ambient temperature.

DETAILED DESCRIPTION

For the purposes of understanding the principles of the invention, reference will now be made to the embodiments illustrated in the drawings and the block diagrams, and specific language will be used to describe the them. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. The present invention can be implemented proposal with various mixtures of analog and digital circuitry.

Figure 2A:
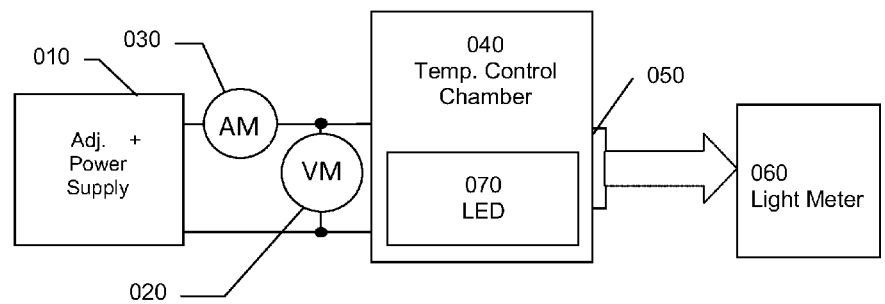
FIG. 2A is a schematic diagram of a set of devices that implements the method of precise temperature brightness compensation.

FIG. 2A illustrates a schematic diagram of a system for method implementation of precise temperature brightness compensation for the LED or the assembly of LEDs. The system includes regular equipment: adjustable power supply unit 010, voltmeter 020, ammeter 030, temperature-controlled chamber 040 with window 050 for exiting light and light meter 060. An LED or is an assembly of LEDs 070 are placed in the temperature-controlled chamber 040 and are connected to adjustable power supply unit 010 through ammeter 030. Voltmeter 020 is connected in parallel with the LED or the assembly of LEDs 070. The LED or the assembly of LEDs 070 placed into temperature-controlled chamber 040 so that the LED or assembly of LEDs 070 emit the light through the temperature-controlled chamber's window 050 onto the light meter 060. The light meter 060 is facing the temperature-controlled chamber's window 050.

Figure 2B:
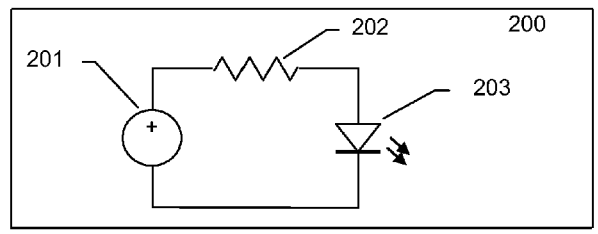
FIG. 2B is a circuit for connecting an LED to an optimal power supply.

FIG. 2B illustrates a circuit for connecting the LED to the optimal power supply. The circuit 200 includes a series-connected voltage source 201 with the optimal output voltage, resistor 202 with the optimal resistance and the LED 203 or the assembly of LEDs.

Figure 2C:
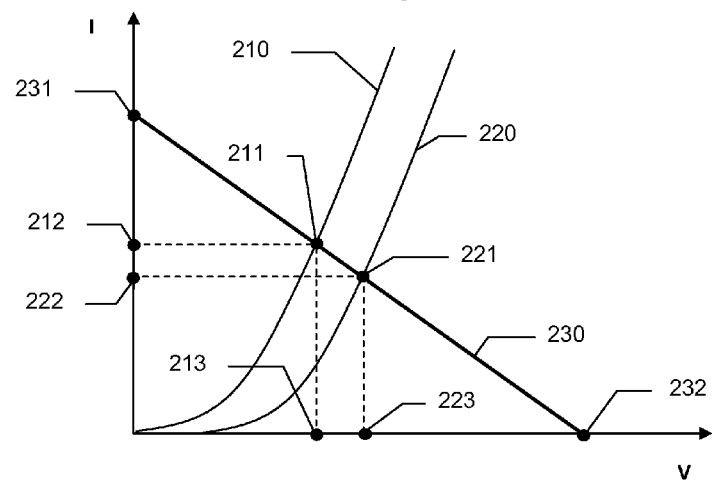
FIG. 2C is a graph showing a method of precise temperature brightness compensation for two temperatures.

FIG. 2C illustrates the dependence of the voltage-current characteristics of the LED or the assembly of LEDs for high and low temperatures. It explains the method of the precise temperature brightness compensation of the LED or the assembly of LEDs for two temperatures.

FIG. 2C show the work of circuit 200 in current (I)-voltage (V) coordinates axes for high (curve 210) and low (curve 220) temperatures. Point 211 denotes a state of the LED or the assembly of LEDs that given current 212 and voltage 213 it has a reference brightness value for high temperature. Point 221 denotes a state of the LED or the assembly of LEDs that given current 222 and voltage 223 it has a reference brightness value for low temperature. Points 211 and 221 define a straight line 230 with two intercepts: the current axis intercept, point 231, and the voltage axis intercept, point 232. Points 231 and 232 ($V_{232}$ and $I_{231}$) can be obtained analytically using coordinates points 211 and 221 ($V_{213}, I_{212}$ and $V_{223}, I_{222}$) and the following formulas:

$$V_{232} = \frac{V_{223}I_{212} - V_{213}I_{222}}{I_{212} - I_{222}}$$

$$I_{231} = \frac{V_{223}I_{212} - V_{213}I_{222}}{V_{223} - V_{213}}$$

With changing temperature, the working point of the LED or the assembly of LEDs moved along this straight line. With increasing temperature, the working point moves from point 221 to point 211. In points 221 and 211 the brightness of the LED or the assembly of LEDs the same. Thus the precise compensation of brightness is ensured at two temperatures points. In the intermediate temperatures the brightness is slightly higher.

FIG. 3 illustrates the block diagram of the precise method of the temperature brightness compensation and process:
1. Placing the LED or the assembly of LEDs 070 (FIG. 2A) into temperature-controlled chamber 040 with output window 050.
2. Connecting the LED or the assembly of LEDs 070 to the adjustable power supply unit 010, voltmeter 020 and ammeter 030.
3. Directing the light of the LED or the assembly of LED 070 to the light meter 060 through output window 050.
4. Setting a high working temperature in the temperature-controlled chamber 040.
5. Adjusting the adjustable power supply unit 010 so that the light meter 060 reads the required brightness of the LED or the assembly of LEDs.
6. Recording the current 212 and the forward voltage 213 of the LED or the assembly of LEDs and plot first point 211 into coordinate space current—voltage.
7. Setting a low working temperature in the temperature-controlled chamber 040.
8. Adjusting the adjustable power supply unit 010 so that the light meter 060 reads the same brightness.
9. Recording the current 222 and the forward voltage 223 of the LED or the assembly of LEDs and plot second point 221 into coordinate space current—voltage.
10. Connecting points 211 and 221 with straight line 230 until it crosses the current and the voltage axes.
11. Using the voltage intercept point 232 of line 230 to calculate the optimal voltage value of source for supply of the LED or the assembly of LEDs 070.
12. Using the ratio of the intercept voltage value to the intercept current value, points 232 and 231 of line 230 gives the value of the optimal resistance of the resistor for supply the LED or the assembly of LEDs.

FIG. 4A illustrates experimental data for single LED yellow color type TLCY5100 without any temperature brightness compensation and the same LED using the method of precise temperature brightness compensation described above. The brightness of LED at temperature 20° C. was taken as a reference level.

The temperature ranges from 0° C. to +40° C. and is presented by the X-axis. The relative brightness (brightness divided by the reference brightness) is presented by the Y-axis. Without compensation (curve "x") with supply of direct current ma in the temperature range from 0° C. to +40° C. relative is brightness of LED varies in the range of ±20%.

With the method of precise temperature brightness compensation (curve "○") and that implies the optimal power supply with voltage 2.16 V and series of the optimal resistor 8.47 Ohm, in the temperature from 0° C. to +40° C., the relative brightness of LED varies in the range of only ±1.85%.

Figure 4B:
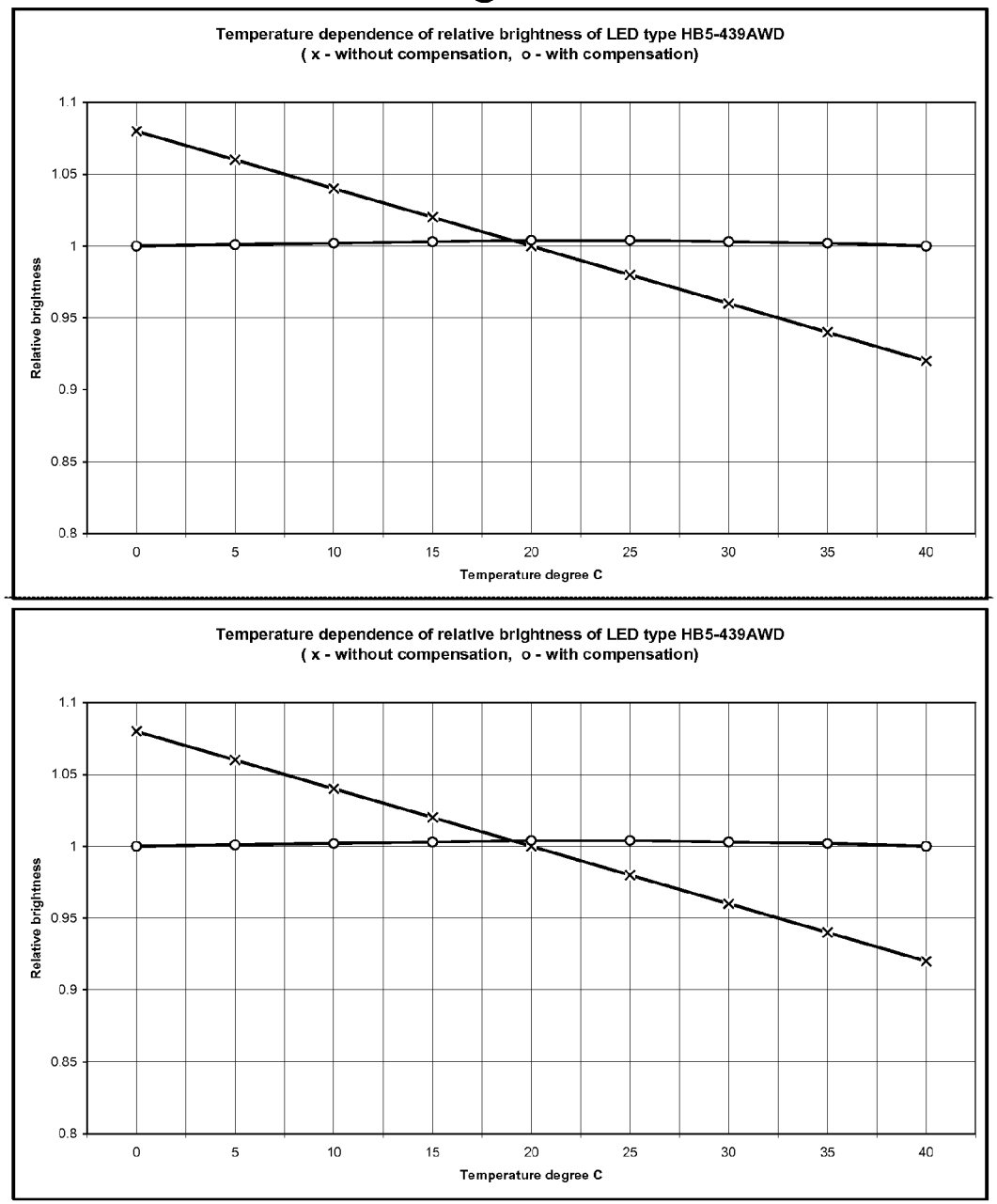
FIG. 4B is a graph showing experimental results of the precise temperature brightness compensation for HB5-439AWD LEDs at two temperatures.

FIG. 4B illustrates experimental data for single LED white color type HB5-439AWD without any temperature brightness compensation and the same LED using the method of precise temperature brightness compensation described above.

The brightness of LED at temperature 20° C. was taken as a reference level. The temperature ranges from 0° C. to +40°

C. and is presented by the X-axis. The relative brightness (brightness divided by the reference brightness) is presented by the Y-axis.

Without compensation (curve "x") with supply of direct current 17 ma in the temperature range from 0° C. to +40° C. relative brightness of LED varies in the range of ±8%. With the method of precise temperature brightness compensation (curve "○") and that implies the optimal power supply with voltage 3.51 V and series of the optimal resistor 24.0 Ohm, in the is temperature from 0° C. to +40° C., the relative brightness of LED varies in the range of only ±0.2%.

Figure 5A:
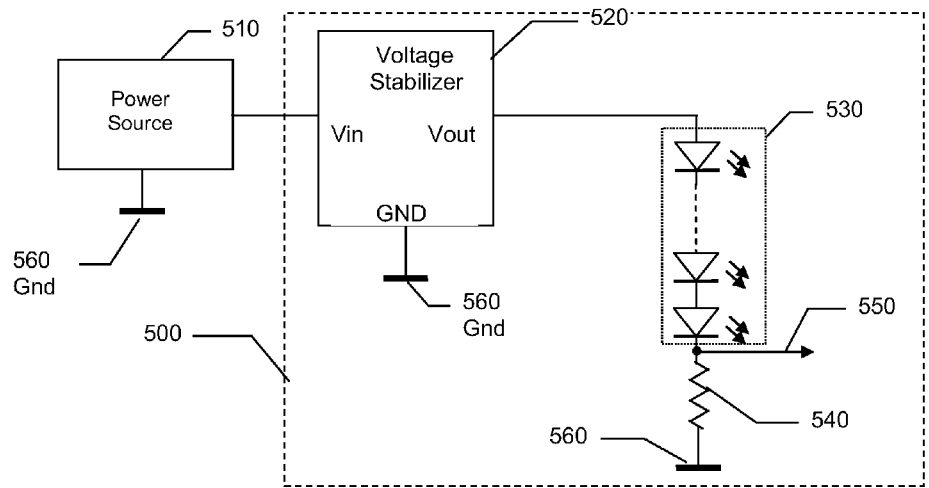
FIG. 5A is a power supply electrical circuit to drive an LED or series of LEDs using the method disclosed in claim 1.

FIG. 5A illustrates a schematic diagram of a circuit according to the first embodiment of the present invention. In this drawing, the assembly of LEDs is represented as a series circuit of the LEDs. The circuit dynamically resists changes in brightness caused by ambient temperature and adjusts the current through the assembly of LEDs to maintain the prespecified brightness of the LEDs.

As shown in FIG. 5A, compensation circuit 500 includes the assembly of LEDs 530. The circuit connects to power source 510. Compensation circuit 500 includes voltage stabilizer 520 with optimal output voltage, the assembly of LEDs 530 (that functions as temperature sensors), optimal resistor 540 and output terminal 550 for a safety system.

Input Vin of voltage stabilizer 520 is connected to power supply 510. Terminal GND of voltage stabilizer 520 is connected to ground 560. Positive terminal of the assembly of LED 530 connects output Vout of voltage stabilizer 520, negative terminal of the assembly of LED 530 connects to the resistor 540. Other terminal of resistor 540 is connected to ground 560.

Common point of the assembly of LED 530 and resistor 540 is connected to output terminal 550. Voltage of output terminal 550 may be used for a safety system.

A temperature rise causes a decline in forward voltage of the assembly of LEDs to produce more current, which compensates a decrease in brightness. A temperature reduction causes an increase in forward voltage of the assembly of LEDs to produce less current which compensate the increase in brightness. The optimal voltage of the voltage stabilizer and the optimal resistance maintain brightness at the same level at the boundaries of the selected temperature range. Experimental data show, that in the middle of the selected temperature range, the brightness of the LED is slightly higher.

The optimal voltage and the optimal resistance for the assembly of LEDs can be calculated from the optimal voltage and the optimal resistance for a single LED. The optimal voltage for the assembly of LEDs equals optimal voltage for a single LED multiplied by the number of LEDs in the series circuit. The optimal resistance for the assembly of LEDs equals optimal is resistance for a single LED multiplied by the number of LEDs in the series circuit.

It is important to choose the correct internal resistance of voltage stabilizer. As a rule, a resistance of external resistor equals to the optimal resistance because the internal resistance of the voltage stabilizer is usually much less than the optimal resistance.

In a non-typical cases, the internal resistance of voltage stabilizer may be comparable with the optimal resistance, may be equal, or even higher than the optimal resistance. When internal resistance of voltage stabilizer is comparable with the optimal resistance, the value of the external resistor equals the optimal resistance minus the internal resistance of the voltage stabilizer. If internal resistance of the voltage stabilizer equals the optimal resistance, the external resistor is excluded from the circuit.

If internal resistance of voltage stabilizer is higher than the optimal resistance, the circuit of the precise brightness compensation does not work. Brightness at high temperature will be less than at low temperature. Thus, the internal resistance of voltage stabilizer must be always smaller is than the optimal resistance.

If the internal resistance of the voltage stabilizer equals the optimal resistance and the external resistor is absent, the signal for safety system can be obtained from the current mirror. In this case the output current of the current mirror can be used for safety system.

Terminal 550 can be used for safety system. Some voltage stabilizers have a special input for turning off output voltage. In such cases, terminal 550 may be used for protection of the assembly of LEDs if maximum allowed current of the LED in the assembly is exceeded. If the voltage stabilizer has a built-in current limiter or current protection, then the output terminal 550 is not used.

Figure 5B:
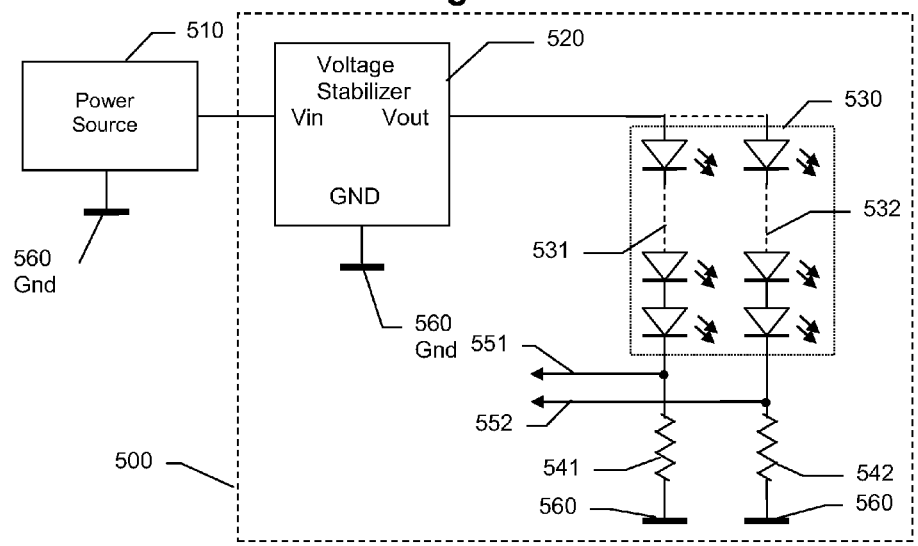
FIG. 5B is an electrical circuit of a power supply for several connected in-parallel series of LEDs utilizing the method of claim 1 to produce precise brightness compensation of LED for two temperatures.

FIG. 5B illustrates a schematic diagram of a circuit according to the first embodiment of the present invention. This assembly of LEDs is represented as several branch in-parallel of series circuit of LEDs. The circuit dynamically resists changes in brightness due to ambient temperature and adjusts the current applied to the assembly of LEDs to maintain the pre-specified brightness of the LEDs.

As shown in FIG. 5B, a compensation circuit 500 includes the assemblies of LEDs 530, (which function as a temperature sensor). The circuit connects to a power source 510. The circuit 500 includes voltage stabilizer 520 with optimal output voltage, the assembly of LEDs 530, optimal resistors 541 and 542, output terminals 551 and 552 for safety system.

Input Vin of voltage stabilizer 520 is connected to power supply 510. GRD terminal of voltage stabilizer 520 is connected to ground 560. This circuit assembly 530 includes several series of LEDs. Each series of LED has the same number of LEDs and the same optimal resistor 541 and 542 that are connected between the series of LEDs 531 and 532 to the ground 560. Positive terminals each series of LEDs 531 and 532 is connected to output Vout of voltage stabilizer 520 and every negative terminal is connected to optimal resistor 541 and 542. Other terminals of resistors 541 and 542 are connected to the ground 560. Common points of series of LED 531 and 532 and resistors 541 and 542 are connected to output terminals 551 and 552 accordingly.

As described above, a temperature increase causes a is decline of forward voltage of series circuit of LEDs to produce more current that compensates the drop in brightness. A temperature decrease causes an increase of forward voltage of series circuit of the LEDs to produce less current that compensates the increase in brightness. The optimal voltage of the voltage stabilizer and the optimal resistance maintain brightness on the same level at the boundaries of the selected temperature range.

Connection in-parallel of the series of LEDs may be done in two ways: a parallel connection of the series of the LEDs that utilizes balancing resistors as showed in FIG. 5B, and a simple connection in-parallel without balancing resistors. The simple connection in-parallel of the series of LEDs without balancing resistors is incorrect, because a small change in the forward voltages of any series of LEDs can cause a very big difference of currents in the series circuits, leading to the thermal failure of one of the series circuits of LED. Therefore, the use of balancing resistors is preferred.

The optimal voltage of the voltage stabilizer and the optimal resistance of the resistors included in an assembly of is LEDs maintain the brightness at the same level as the boundaries of the selected temperature range. The optimal voltage for the in-parallel assembly of LEDs equals the optimal voltage for a single LED multiplied by the number of LEDs in the series circuits.

The resistance of the external resistors depends on the internal resistance of the voltage stabilizer. When the internal resistance of the voltage stabilizer is substantially smaller then the optimal resistance divided by the number of parallel branches, the external resistors equal to the optimal resistance of a single LED multiplied by the number of LEDs in series circuit. Generally, the resistance of the external resistors equals to the optimal resistance of the series circuits minus the internal resistance of the voltage stabilizer multiplied by the number of parallel branches. If the resistance of voltage stabilizer is greater than the optimal resistance series circuits divided by the number of parallel branches, then this voltage stabilizer does not ensure temperature compensation brightness.

If the primary voltage supply has a stable output voltage and negligible internal resistance, then the voltage is stabilizer can be replaced with a voltage divider. The values of the resistors for the voltage divider are chosen so that the open circuit voltage equals the optimal voltage of an assembly of LEDs, and the resistors in-parallel of the voltage divider should have optimal resistance. This makes it possible to manufacture LEDs modules with embedded precise temperature brightness compensation. Such modules can be used in automobile industry.

FIG. 6 illustrates the dependence of the voltage-current characteristics of the LED for high, middle and low temperatures and explains the method of precise temperature brightness compensation of the LED for three temperatures values. FIG. 6 shows voltage-current characteristics of the LED in current (I)-voltage (V) coordinates for high 610, middle 620 and low 630 temperatures. For high temperature (curve 610) point 611 defines values of current 612 and voltage 613 of the LED corresponding to a specified brightness level. For middle temperature (curve 620), point 621 defines values of current 622 and voltage 623 of the LED corresponding to the same brightness level as in point 611. Points 611 and 621 define a straight line 640 with voltage (V) and current (I) intercepts. This part of the drawing explains the work of LED in the range from high to middle temperatures. Thus for a temperature interval from high to middle temperatures, the optimal voltage of supply is voltage (V) intercept point 642.

The optimal resistance of the resistor equals to the ratio of voltage (point 642) to current axis intercept (point 641) of line 640.

For low temperature (curve 630), point 631 defines values of current 632 and voltage 633 of LED that correspond to the same brightness level as in points 611 and 621. Points 621 and 631 define a straight line 650 with voltage (V) and current (I) axes intercepts. This part of the drawing explains the work of LED in the range from middle to low temperatures. For a temperature interval from middle to low temperatures, the optimal voltage (point 652) is the voltage (V) axis intercept. The optimal resistance equals a ratio of voltage intercept (point 652) to current intercept (point 651) of line 650.

In order to compensate brightness of the LED at three is temperatures values, it is necessary to switch values the optimal voltage and the optimal resistors when the LED is operated in a different temperature interval. If the actual forward voltage of the LED is less than the voltage in middle temperature (point 623), then the circuit should be powered by the high-middle interval settings. If the actual forward voltage of the LED is more than the voltage in middle temperature (point 623), then the circuit should be powered by the middle-low interval settings. The working point of the LED is located the other the linear segments (631, 621) or (621, 611) of the straight lines 640 or 650.

For three temperature points there are two temperature intervals. For each temperature interval we define two independent parameters: optimal voltage and an optimal resistance. We call these parameters an "interval setting". The power supply of the circuit can be switched from one "interval setting" to another. When the power supply switches onto the high-middle "interval setting" it means that the voltage of the power supply becomes equal to the optimal voltage of the high-middle temperature interval and the resistance of the circuit becomes equal to the optimal resistance value of the high-middle is temperature interval.

Thus, with an increase of temperature from low to high the working point moves along the straight line 650 from point 631 to point 621, and after a power supply switch, it moves along the straight line 640 from point 621 to point 611. In the points 631, 621 and 611, the brightness of the LED is the same. Thus, precise compensation of brightness at three temperatures is ensured.

FIG. 7 illustrates a schematic block diagram of the method of the precise temperature compensation for the LED or the assembly of LEDs at three temperatures which includes the steps:

1. Dividing the temperature operating range of the LED or the assembly of LEDs at two temperature intervals: from high to middle temperature and from middle to low temperature.
2. For temperature interval from high to middle temperatures, using the aforesaid method to find first optimal voltage and first optimal resistance.
3. For temperature interval from middle to low temperatures, using aforesaid method to find the second optimal voltage and second optimal resistance.
4. Recording the value of the forward voltage of the LED or assembly of LEDs at middle temperature.
5. With an increasing temperature and a decreasing forward voltage of the LED or the assembly of LEDs is less than recorded the forward voltage at the middle temperature connect the LED to the power supply with first optimal voltage through resistor with first optimal resistance.
6. With a decreasing temperature and increasing the forward voltage of the LED or the assembly of LEDs equal or more then recorded the forward voltage at the middle temperature connect the LED or the assembly of LEDs to the power supply with second optimal voltage through resistor with second optimal resistance.

There are several ways to choose the middle temperature to minimize the variation of brightness. The easiest way is to choose the middle temperature in the center of the temperature range. Experiments show that at temperature range 0° C. to +40° C. maximal deviation of brightness is in the center of the temperature range +20° C. For a very broad temperature range, −40° is to +85° C., for example, choosing the center point is inappropriate. A better method to find a middle temperature point includes the following steps.

1. Using the method of the precise temperature brightness compensation for two temperatures, high and low, and finding the optimal voltage and the optimal resistance.
2. Connecting the LED to the power source with optimal voltage and optimal resistor and recording the data of the brightness of the LED for each temperature point.

3. Plotting this data, and finding a temperature point on this graph such that the deviation of brightness from the specified brightness is the largest.
4. Choosing this temperature as the middle temperature point.

Figure 8:
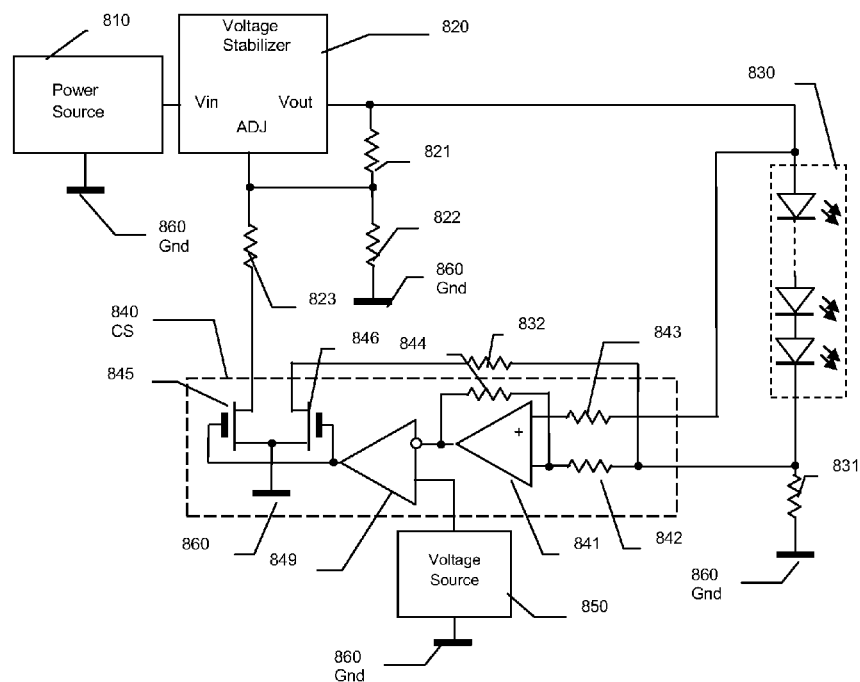
FIG. 8 is an electrical circuit for a power supply to drive a series of LEDs using the method disclosed in claim 7.

FIG. 8 illustrates a schematic diagram of a circuit according to the second embodiment of the present invention. The circuit dynamically adjusts the current applied to the LED assembly to maintain the brightness of the LED and ensures precise compensation of brightness of the LED or the assembly of LED at three temperatures.

As follows from the explanation, to implement the circuit for precise temperature brightness compensation at three is temperatures points, it is necessary to have two voltage stabilizers with different values of the optimal voltage, two optimal resistors and four switches—two for switching the optimal voltage and two for switching the optimal resistors. The optimal voltage and the optimal resistors must be switched in the corresponding temperature intervals. But it is also possible to use a single adjustable voltage stabilizer and only two switches.

As shown in FIG. 8 the compensation circuit includes: adjustable voltage stabilizer 820, resistors 821, 822 and 823 for choosing optimal voltage of stabilizer 820 on different of temperature intervals, the assembly of LEDs 830 as a light source and as the temperature sensor, resistors 831 and 832 for choosing optimal resistance on different of temperature intervals, reference voltage source 850 and the control system 840 for switching the optimal voltage and the optimal resistors at two temperature intervals.

The circuit is supplied from a power source 810. Input $V_{in}$ of adjustable voltage stabilizer 820 is connected to power supply 810. Resistor 821 connects output $V_{out}$ with adjustable is input ADJ of adjustable voltage stabilizer 820. Resistor 822 connects adjustable input ADJ of adjustable voltage stabilizer 820 with ground 860. Resistors 821 and 822 predetermine the optimal voltage of adjustable voltage stabilizer 820 at temperature interval from middle to low temperatures.

The common point of resistors 821 and 822 is connected to resistor 823. The other terminal of resistor 823 is connected to switch 845 of control system 840 for switching the optimal voltage at temperature interval from high to middle temperatures. Resistors 823, 822 and resistor 821 defines the optimal voltage of voltage stabilizer 820 at temperature interval from high to middle temperatures. The assembly of LEDs 830 connects between output $V_{out}$ of the adjustable voltage stabilizer 820 and optimal resistor 831.

The other terminal of resistor 831 is connected to ground 860. Resistance of resistor 831 equals the optimal resistance at temperature interval from middle to low temperatures. The common point of the assembly of LEDs 830 and resistor 831 is connected to resistor 832.

The other terminal of resistor 832 is connected to switch 846 of the control system 840 for switching the optimal is resistor at temperature intervals from middle to high temperature. The resistance of in-parallel resistors 831 and 832 equals to optimal resistance at temperature interval from high to middle temperatures.

Control system 840 switches the optimal voltage and resistors at different temperature intervals and includes: op-amp 841, resistors 842 and 843, resistor of negative feedback 844, comparator 849 and two MOSFET switches 845 and 846.

Resistor 842 connects between inverting input op-amp 841 and common point of LED or assembly of LED 830 and resistor 831. Resistor 843 connects non-inverting input op-amp 841 with common point of the assembly of LEDs 830 and with output $V_{out}$ of adjustable voltage stabilizer 820. Resistor of negative feedback 844 connects the output with the inverting input op-amp 841. Output of op-amp 841 is connected to the inverting input of comparator 849. Non-inverting input of comparator 849 is connected to the output of the reference voltage source 850. Output of comparator 849 is connected to gates of MOSFET switches 845 and 846. Sources of MOSFET switches 845 and 846 are connected to ground 860. The drain of MOSFET switch 845 is is connected to resistor 823 and drain of MOSFET switch 846 is connected to resistor 832.

FIG. 8 shows that resistor 843 connects to the common point of the assembly of LEDs and the output $V_{out}$ of adjustable voltage stabilizer 820. Resistor 843 may be connects to one, two or any number of LEDs of series at the assembly of LEDs.

Reference voltage source 850 controls the switching threshold of optimal voltage for power source and optimal resistors at different temperature intervals. The value voltage of reference voltage source 850 depends on the gain factor of op-amp 841 and the forward voltage of the assembly of LEDs 830 at middle temperature. If the gain factor of op-amp 841 equals to one, then the value reference voltage source 850 equals to the forward voltage of assembly of LEDs 830 at middle temperature. If not, then the value voltage of reference voltage source 850 equals to the forward voltage of the assembly of LEDs multiplied by the gain factor of op-amp 841.

When the ambient temperature is between low and middle, the value of the forward voltage on the assembly of LED 830 is greater than the forward voltage on the assembly of LEDs 830 at middle temperature.

In this case the output voltage op-amp 841 is greater than the voltage of reference source 850, and the voltage on output comparator 849 has low potential. Now MOSFET switches 845 and 846 are closed. The assembly of LEDs supply from the source with optimal voltage assignable the divider consist of resistors 821 and 822 through optimal resistor 831.

When ambient temperature is between high and middle, the value of the forward voltage on the assembly of LED 830 is less than the forward voltage on the assembly of LEDs 830 at middle temperature. In this case the output voltage op-amp 841 less than voltage of reference source 850, and voltage on output comparator 849 has high potential. Now MOSFET switches 845 and 846 are opened. The assembly of LEDs supply from the source with optimal voltage assignable the divider consist of resistors 821, 822, 823 arranged in parallel through optimal resistor 831 in parallel with resistor 832.

MOSFET switches 845 and 846 of the control system 840 can be replaced by FET, bipolar transistors, optoelectronic switch, optoelectronic relay, reed relay or other electronic switches.

While the invention has been illustrated and described in details in the drawings and foregoing description, the same is to be considered as illustrative and not restrictive in character, it being understood that only certain embodiments have been shown and described and that all equivalents, changes, and modifications that come within the spirit of the inventions as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

Elements referenced in the specification and FIGS. 2A-8 are listed below, with abbreviations used in the figures.
- 010 Adjustable Power Supply Unit
- 020 Voltmeter (VM)
- 030 Ammeter (AM)
- 040 Temperature-Controlled Chamber
- 050 Window
- 060 Light Meter
- 070, 530, 531, 532, 830 LED
- 500 Compensation Circuit
- 510, 810 Power Source
- 520, 820 Voltage Stabilizer
- 540, 541, 542, 821, 822, 823 Optimal Resistor (OR)
- 550, 551, 552 Output Terminal (OT)
- 560, 860 Ground (Gnd)
- 840 Control System (CS)
- 841 Op-Amp
- 842, 843 Resistors
- 844 Negative Feedback Resistor
- 845, 846 Switch
- 849 Comparator
- 850 Voltage Source Patent Literature

| Cited Patent | Filing date | Publication date | Applicant | Title |
|---|---|---|---|---|
| U.S. Pat. No. 6,111,739 | Aug. 11, 1999 | Aug. 29, 2000 | Leotek Electronics Corporation | LED power supply with temperature compensation. |
| U.S. Pat. No. 6,127,784 | Aug. 31, 1998 | Oct. 3, 2000 | Dialight Corporation | LED driving circuitry with variable load to control output light intensity of an LED |
| U.S. Pat. No. 6,693,394 | Jan. 25, 2002 | Feb. 17, 2004 | Yazaki North America, Inc. | Brightness compensation for LED lighting based on ambient temperature |
| U.S. Pat. No. 7,286,123 B2 | Dec. 13, 2005 | Oct. 23, 2007 | System General Corp. | LED driver circuit having temperature compensation |
| U.S. Pat. No. 7,683,864 | Jan. 24, 2007 | Mar. 23, 2010 | Samsung Electro-Mechanics Co., Ltd. | LED driving apparatus with temperature compensation function |
| U.S. Pat. No. 7,755,303 | Feb. 21, 2006 | Jul. 13, 2010 | GM Global Technology Operations, Inc. | Automobile lighting pulse width modulation duty cycle control with voltage and temperature compensation |
| U.S. Pat. No. 7,812,553 | Mar. 28, 2007 | Oct. 12, 2010 | Samsung Electronics Co., Ltd. | LED lighting device and method for controlling the same based on temperature changes |
| U.S. Pat. No. 7,986,112 | Sep. 15, 2005 | Jul. 26, 2011 | MAG Instrument, Inc. | Thermally self-stabilizing LED module |
| U.S. Pat. No. 8,159,153 B2 | Oct. 1, 2010 | Apr. 17, 2012 | Bridgelux, Inc. | LED light sources with improved thermal compensation |
| U.S. Pat. No. 8,264,171 B1 | May 7, 2010 | Sep. 11, 2012 | IXYS Corporation | In-situ LED junction temperature monitoring using LED as temperature sensor |
| US 2012-0068627 | | 2012 Mar. 22 | | Temperature compensation LED constant current source |

NON PATENT LITERATURE

1. Simple, 90V, 25 ma, Temperature Compensated, Constant Current, LED Driver IC—http://www.supertex.com/pdf/misc/CL25_PSS.pdf
2. MT7910 High Brightness LED Driver—http://www.szc-zkjgs.com/uploadfiles/fujian/3556/MT7910%20 Datasheet %20REV0%2054.pdf
3. TLCS510., TLCR510., TLCO510., TLCY510., TLCYG510., TLCPG510.Ultrabright LED, Ø 5 mm Untinted Non-Diffused Package—http://www.vishay.com/docs/81346/ticx510.pdf
4. TLHB580. High Efficiency Blue LED, 5 mm Untinted Non-Diffused Package—http://www.farnell.com/datasheets/6505.pdf

The invention claimed is:

1. A method of compensation of brightness of the LED or the assembly of LED, ensure the precise compensation at least at three temperatures, comprising the steps of:
   a. Dividing the temperature operating range of the LED or the assembly of LEDs into two temperature intervals, from a high to middle temperature, and from the middle to low temperature;
   b. Finding a first optimal voltage and first optimal resistance for temperature interval from high to middle temperatures by:
      1) Placing an LED assembly into a temperature-controlled container with a window;
      2) Connecting the LED assembly to an adjustable power supply unit with a voltmeter across the LED assembly, and an ammeter in series with the LED assembly;
      3) Directing the LED assembly to a light meter through the output window of the temperature-controlled container;
      4) Setting a high working temperature in the temperature-controlled container;
      5) Adjusting the power supply unit so that the light meter reads the required brightness of the LED assembly;
      6) Recording the current and the forward voltage of the LED assembly at the high temperature setting;
      7) Setting a low working temperature in the temperature-controlled container;
      8) Adjusting the adjustable power supply so that the light meter reads the same brightness as it did when the container was at the previous high temperature setting;
      9) Recording the current and the forward voltage of the LED assembly at the low temperature setting necessary to achieve the same brightness measured at the high temperature setting 10) Plotting the currents and voltages recorded at the high and low temperatures on a two-dimensional current-voltage graph;

11) Connecting the graph points of the high and low temperature results with a straight line until it crosses the current and the voltage axes;

12) Using the voltage intercept point on the graph as the optimal voltage value of source for supply of the LED or the assembly of LEDs for consistent brightness; and 13) Using the ratio of the intercept voltage value to the intercept current value as the value of the optimal resistance of the resistor for supply of the LED assembly c. Finding a second optimal voltage and second optimal resistance for temperature from middle to low temperature by repeating the method described by 1) through 13) listed above in step b d. Recording the value of the forward voltage of the LED or the assembly of LEDs at a middle temperature;

e. Connecting the LED or the assembly of LEDs to the power supply set at the first optimal voltage output through a resistor with the first optimal resistance, and increasing the temperature of the LED or the assembly of LEDs, recording the forward voltage when the LED is at the middle temperature as the temperature is increased;

f. With a decreasing temperature and increasing voltage of the LED or the assembly of LED equal or more than recorded forward voltage on middle temperature connect the LED or the assembly of LED to the power supply with second optimal voltage through resistor with second optimal resistance.

2. The method of claim 1 choosing value of middle temperature comprising the steps of:
  a. Finding the optimal voltage and optimal resistance using the method described in 1) through 13) listed in claim 1, step b;
  b. Connecting the LED assembly to the optimal supply and plotting a graph of brightness versus temperature;
  c. Locating on the graph the temperature with maximal deviation of brightness and using the temperature as the middle temperature.

3. The LED driving apparatus of claim 1 comprising:
  a. A primary power supply;
  b. An adjustable voltage stabilizer;
  c. The assembly of LEDs as temperature sensor;
  d. A reference voltage source and a control system;
  e. Said voltage stabilizer has a input, a output and an adjusting package terminals;
  f. Said control system has inverting and non-inverting inputs for measuring forward voltage of the LED or the assembly of LEDs, input for said reference voltage source, two outputs for switch optimal voltage and optimal resistor for different temperature intervals.

4. The LED driving apparatus of claim 3, wherein:
  a. The input terminal of said voltage stabilizer connects to primary power supply;
  b. The output terminal of said voltage stabilizer connects to resistor, with the other terminal resistor connected to the adjusting terminal of said voltage stabilizer and to two resistors other terminal first resistor connect to ground;
  c. The other terminal second resistor connects to first output of said control system;
  d. The output terminal of said voltage stabilizer connects to one terminal of the LED assembly;
  e. The other terminal of the LED assembly connects to two resistors;
  f. The other terminal of first resistor connects to ground;
  g. The other terminal of second resistor connects to the second output said control system;
  h. The reference voltage source connect to input for said reference voltage source;
  i. The non-inverting input said control system connects to the output said voltage stabilizer;
  j. The inverting input said control system connects to the other terminal of the LED assembly.

5. The LED driving apparatus of claim 3, wherein the non-inverting input control system connects to one or more LED assemblies.

6. The LED driving apparatus of claim 3, wherein the control system further comprises:
  a. An op-amp;
  b. Comparator; and,
  c. Two MOSFET switch.

7. The LED drive apparatus of claim 3, wherein:
  a. The non-inverting input op-amp is connected through a resistor to the non-inverting input control system;
  b. The inverting input op-amp is connected through a resistor connected to the inverting input control system;
  c. The output op-amp is connected through a resistor to the inverting input op-amp;
  d. An output op-amp is connected to the inverting input comparator;
  e. A non-inverting input comparator is connected to a reference voltage source;
  f. The output of comparator is connected to two MOSFET switch gates;
  g. Two sources of MOSFET switches connect to ground;
  h. Drains of MOSFET switches are connected to outputs of control system.

8. The LED driving apparatus of claim 3, wherein the control system further includes:
  a. The switches are field-effect transistors, optoelectronic switch, optoelectronic relay, reed relay or other electronic switches.

9. The method of compensation of brightness of the LED or the assembly of LED, ensure the precise compensation at least at N temperatures, comprising the steps of:
  a. Dividing the temperature operating range of the LED assembly into N−1 temperature interval: first—from $T_1$ to $T_2$, second—from $T_2$ to $T_3$, etc., and last from $T_{N-1}$ to $T_N$ temperature;
  b. Calculating the optimal voltage and optimal resistance for every temperature interval by:
    1) Placing an LED assembly into a temperature-controlled container with a window;
    2) Connecting the LED assembly to an adjustable power supply unit with a voltmeter across the LED assembly, and an ammeter in series with the LED assembly;
    3) Directing the LED assembly to a light meter through the output window of the temperature-controlled container;
    4) Setting a high working temperature in the temperature-controlled container;
    5) Adjusting the power supply unit so that the light meter reads the required brightness of the LED assembly;

6) Recording the current and the forward voltage of the LED assembly at the high temperature setting;
7) Setting a low working temperature in the temperature-controlled container;
8) Adjusting the adjustable power supply so that the light meter reads the same brightness as it did when the container was at the previous high temperature setting;
9) Recording the current and the forward voltage of the LED assembly at the low temperature setting necessary to achieve the same brightness measured at the high temperature setting
10) Plotting the currents and voltages recorded at the high and low temperatures on a two-dimensional current-voltage graph;
11) Connecting the graph points of the high and low temperature results with a straight line until it crosses the current and the voltage axes;
12) Using the voltage intercept point on the graph as the optimal voltage value of source for supply of the LED or the assembly of LEDs for consistent brightness; and
13) Using the ratio of the intercept voltage value to the intercept current value as the value of the optimal resistance of the resistor for supply of the LED assembly c. Recording the forward voltage at edge of every temperature interval;
d. Decreasing the forward voltage on the LED assembly and recording the forward voltage at edge of every temperature interval, and then connecting the LED assembly to the previous power supply with fit optimal voltage and fit optimal resistance; then,
e. Increasing the forward voltage on the LED assembly and recording that forward at the edge of every temperature interval, and then connecting the LED assembly to the power supply with fit optimal voltage and fit optimal resistance.

* * * * *